(12) United States Patent
Agladze et al.

(10) Patent No.: US 6,930,781 B2
(45) Date of Patent: Aug. 16, 2005

(54) MINIATURIZED HOLOGRAPHIC FOURIER TRANSFORM SPECTROMETER WITH DIGITAL ABERRATION CORRECTION

(75) Inventors: Nikolay I. Agladze, Ithaca, NY (US); Albert J. Sievers, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 10/720,763

(22) Filed: Nov. 25, 2003

(65) Prior Publication Data

US 2004/0114148 A1 Jun. 17, 2004

Related U.S. Application Data

(60) Provisional application No. 60/428,907, filed on Nov. 26, 2002.

(51) Int. Cl.[7] .............................................. G01B 09/02
(52) U.S. Cl. ...................................................... 356/456
(58) Field of Search ............................... 356/451, 453, 356/455, 456; 250/339.08

(56) References Cited

U.S. PATENT DOCUMENTS

| | | | | |
|---|---|---|---|---|
| 4,585,345 A | * | 4/1986 | Inoue .......................... | 356/455 |
| 4,976,542 A | * | 12/1990 | Smith .......................... | 356/456 |
| 5,495,334 A | * | 2/1996 | Nagoshi et al. .............. | 356/456 |
| 5,781,293 A | | 7/1998 | Padgett et al. | |
| 6,051,835 A | * | 4/2000 | Pettipiece et al. .......... | 356/456 |
| 6,075,599 A | * | 6/2000 | Milman et al. .............. | 356/455 |
| 6,687,007 B1 | * | 2/2004 | Meigs .......................... | 356/456 |
| 6,721,057 B1 | | 4/2004 | Reininger | |

OTHER PUBLICATIONS

"Digital array scanned interferometer: sensors and results," Wm Hayden Smith and Philip D. Hammer; Applied Optics, vol. 35, No. 16, June 1996.

"Photographic Method of Recording in Fourier Spectrometry," I.P. Petrov and B.N. Grechushnikov; Optics and Spectroscopy, 19, p. 82–83 (1965).

"Computational Aberration Correction for an Arbitrary Linear Imaging System," L. J. Allen, M. P. Oxley, and D. Paganin; Physical Review Letters, vol. 87, No. 12, Sep. 17, 2001.

"Effects of abberations on spatially modulated Fourier transform spectrometers," R. Glenn Sellar, J. Bruce Rafert; Optical Engineering, Sep. 1994, vol. 33, No. 9/3087.

"Fourier transform spectrometer with a self–scanning photodiode array," Takayuki Okamoto, Satoshi Kawata, and Shigeo Minami; Applied Optics, Jan. 15, 1984, vol. 23, No. 2.

"Spatially Encoded Fourier Transform Spectroscopy in the Ultraviolet to Near–Infrared," Jonathan V. Sweedler and M. Bonner Denton; Applied Spectroscopy, vol. 43, No. 8, 1989.

"Monolithic Fourier–transform imaging spectrometer," J. Bruce Rafert, R. Glenn Sellar, and Joel H. Blatt; Applied Optics, vol. 34, No. 31, Nov. 1, 1995.

"Phase Retrieval through Focus Variation for Ultra–Resolution in Field–Emission Transmission Electron Microscopy," Wim Coene and Guido Janssen, Marc Op de Beeck and Dirk Van Dyck; Physical Review Letters, vol. 69, No. 26, Dec. 28, 1992.

* cited by examiner

*Primary Examiner*—Samuel A. Turner
(74) *Attorney, Agent, or Firm*—Jones, Tullar & Cooper P.C.

(57) ABSTRACT

A digitally aberration corrected miniaturized holographic Fourier transform spectrometer (HFTS) made from simple optical components and with no moving parts is provided. The disclosed digitally aberration corrected HFTS is comprised of a two beam interferometer, which provides two interfering beams; a 2D array detector to detect the interference pattern created by the beams; a computer for correcting effects of aberrations in the pattern and calculating the spectrum from thus corrected interferogram.

7 Claims, 4 Drawing Sheets

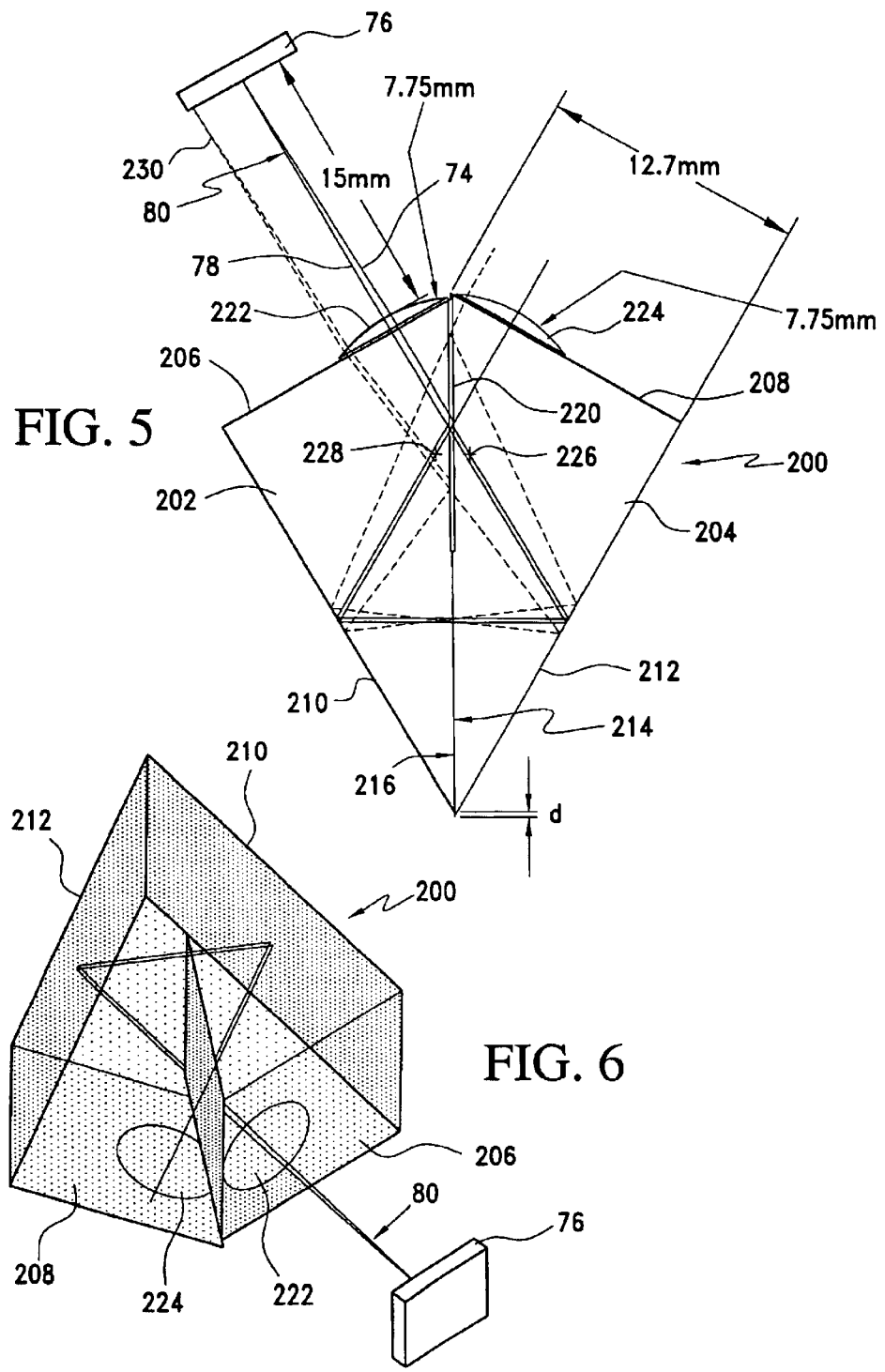

MINIATURIZED HOLOGRAPHIC FOURIER TRANSFORM SPECTROMETER WITH DIGITAL ABERRATION CORRECTION

This application claims the benefit of U.S. Provisional application No. 60/428,907, filed Nov. 26, 2002, the disclosure of which is hereby incorporated herein by reference.

BACKGROUND OF THE INVENTION

This invention relates to the field of optical spectrometers, and more particularly to holographic Fourier transform spectrometers (HFTS), and more particularly to an aberration-limited HFTS having improved performance due to the digital aberration correction.

The idea of using optical interference for retrieval of spectral information has a long history, dating back to the 19th century and works by H. Fizeau, L. Foucault and later A. A. Michelson. Rapid development of interferometric spectroscopy in the second half of the 20th century started with groundbreaking works by Fellgett and Jacquinot, who were first to document the multiplex and throughput advantages of the Fourier spectroscopic technique. By the 1960's step scan interferometers dominated the far infrared spectral region, but due to the slowness of the computers available at that time an incentive existed to eliminate the computing step of the conversion of the interferogram into its corresponding spectrum.

The first successful application of optical processing for restoration of spectral information from a hologram was demonstrated in 1965, but this application involved the scanning of one arm of the interferometer, while moving the recording medium at the same speed. The first demonstration of a completely static Fourier transform spectrometer (FTS) was published at about the same time. In this experiment a two beam interference pattern was produced in a birefringent crystalline quartz prism and reimaged on a photographic plate. After digitization, the interferogram was converted into a spectrum using a computer. A few other examples of a holographic FTS (HFTS) with optical transformation of the interferogram appeared later, using a tilted mirror in a Michelson-Twyman-Green interferometer, shearing Sagnac interferometer, Lloyd's mirror, and a modified Mach-Zehnder interferometer. But the rapid progress of digital computing power, the invention of a fast Fourier transform algorithm, and the broad use of photoelectric radiation detectors instead of photographic plates has made the optical Fourier transformation of interferograms unnecessary.

With scanning FTS firmly established in the far infrared and infrared, and grating spectrometers dominating the UV/visible region, where due to predominantly photon noise the Fellgett multiplex advantage does not exist, the development of HFTS devices appeared to reach steady state. However, a new thrust in this area started when the static interference pattern in the output of the interferometer was sampled with a multichannel photodiode detector, connected to a microcomputer. The resulting capability to provide imaging information in one direction with the spectral information in the other, combined with a compact and rugged design with no moving parts, made HFTS very attractive for remote sensing (often called digital array scanned interferometers or DASI, U.S. Pat. No. 4,976,542). Holographic FTS also were successfully tested in astronomy, single event rapid spectroscopy, Raman spectroscopy, and toxic gases monitoring.

SUMMARY OF THE INVENTION

There is another emerging field where HFTS's have a large potential; namely, in the miniaturization of spectral devices. Although miniature spectrometers of the dispersive type with few centimeter size are already available commercially, it has been found that the high throughput of HFTS allows such devices to be made significantly smaller than dispersive type spectrometers for a given resolving power. Therefore, in accordance with the present invention, a simplified optical system suitable for miniaturization is provided for an HFTS with digital aberration correction.

The interferometric HFTS principle of operation is based on the relative shifting of two virtual coherent images of the radiation source, located at the front focal plane of the output optical system. At the back focal plane of the optical system, parallel beams originating at each of the images produce an interference pattern. In the absence of optical aberrations the spatial frequency of the interference fringes of this pattern is directly related to the spectral frequency of the radiation source, so that the whole spectrum can be restored from the digitized interference pattern by a Fourier transformation. In the presence of optical aberrations the interference pattern is distorted and the same Fourier transformation results in a distorted frequency spectrum with greatly degraded optical resolution. Due to this fact, all known HFTS either use high performance lenses with the aberrations corrected by the standard means of optical engineering or operate with small numerical apertures.

The present invention is directed to an HFTS with a simplified optical system, where the effects of optical aberrations are corrected by an appropriate digital transformation of the interference pattern. The effect of aberrations on the interference pattern in the focal plane of the output lens can be described as additional contributions to the aberration free linear phase shift between two interfering beams. This contribution restricted to the primary aberrations is:

$$\Delta y' = a_{100}\xi + a_{200}2K\xi + a_{020}2P\xi_P + a_{110}(P\xi + K\xi_P) + a_{011}T\xi_P + a_{101}T\xi.$$

The pupil location is chosen to be at the detector plane and dimensionless coordinates are introduced, where x and y relate to the coordinates in the field of view of the output Fourier lens with focal distance f and x' and y' are the coordinates in the pupil:

$$\xi = y/f, \ \eta = x/f, \ \xi_P = y'/f, \ \eta_P = x'/f.$$

The symmetrized combinations of the dimensionless coordinates are also introduced:

$$K = 1/2(\xi^2 + \eta^2), \ P = \xi\xi_P + \eta\eta_P, \ T = 1/2(\xi_P^2 + \eta_P^2).$$

The term $a_{011}T\xi_P$ contains only pupil coordinates and does not depend on the field coordinates. It is responsible for the fixed distortion of the parallel interference fringes. There are several higher order aberrations as well as certain defects of the optics with such property.

The present invention suggests a simple way of correcting these aberrations by rescaling the interference pattern to compensate for the distortion. The result will straighten the interference fringes.

The simple digital aberration correction procedure of the invention is different in several aspects from more general methods that are based on a phase restoration technique. First, the previous applications of the aberration correction were used for imaging systems, not for afocal ones such as the HFTS. Second, the correction described here is applicable to a broadband source, not a monochromatic one as is usual in electron microscopy. And third, there is no need for a series of images with variable focal position or some other parameter.

BRIEF DESCRIPTION OF DRAWINGS

The foregoing, and additional objects, features and advantages of the present invention will be apparent to those of skill in the art from the following detailed description of preferred embodiments thereof, taken with the accompanying drawings, in which:

FIG. 5 is a diagrammatic ray tracing for a miniaturized HFTS using microlenses and Littrow prisms, in accordance with a third embodiment of the invention;

FIG. 6 is a diagrammatic three-dimensional illustration of the HFTS of FIG. 5;

DESCRIPTION OF PREFERRED EMBODIMENTS

The foregoing concepts have been utilized, in accordance with the invention, in fabricating miniaturized, scalable HFTS devices, and several embodiments of such devices are described herein below. In a first embodiment, a scalable cylindrical interferometer with an additional external lens (not necessarily miniature) was fabricated and tested. A second embodiment was based on custom made small Littrow prisms and standard microlenses, while a third embodiment was made entirely from standard optical off-the-shelf components and was assembled into a complete spectrometer with a CMOS array detector and a laptop computer. A fourth embodiment, for use where a vacuum enclosure is required, is an asymmetric shift interferometer utilizing a polarizing beamsplitter.

Figure 1:
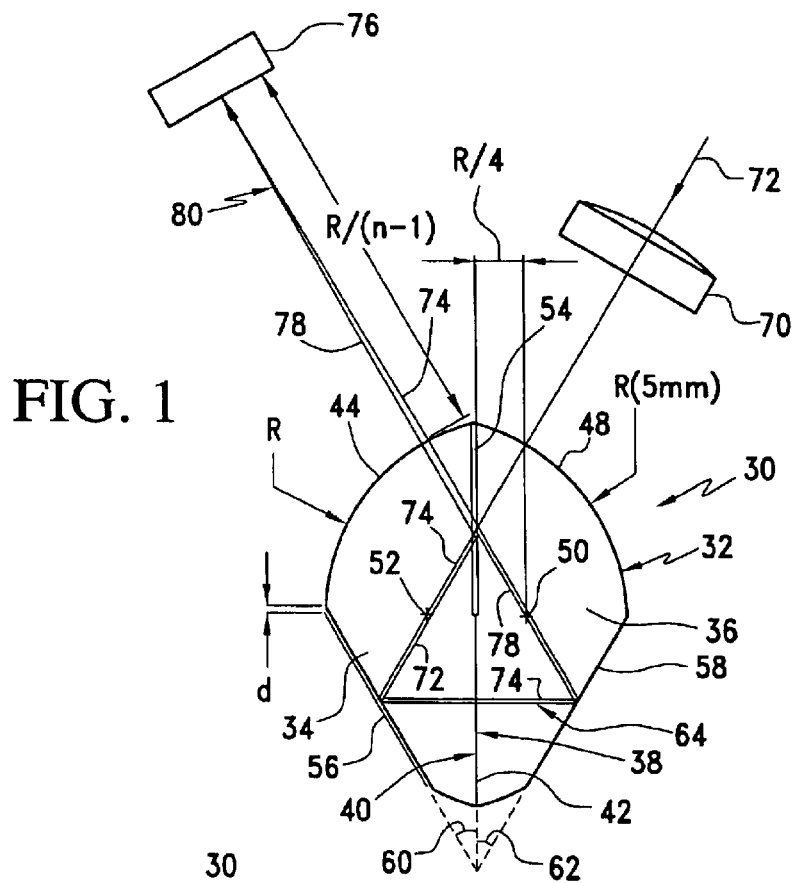
FIG. 1 is a diagrammatic ray tracing for a miniaturized scalable cylindrical HFTS in accordance with a first embodiment of the invention.
Figure 2:
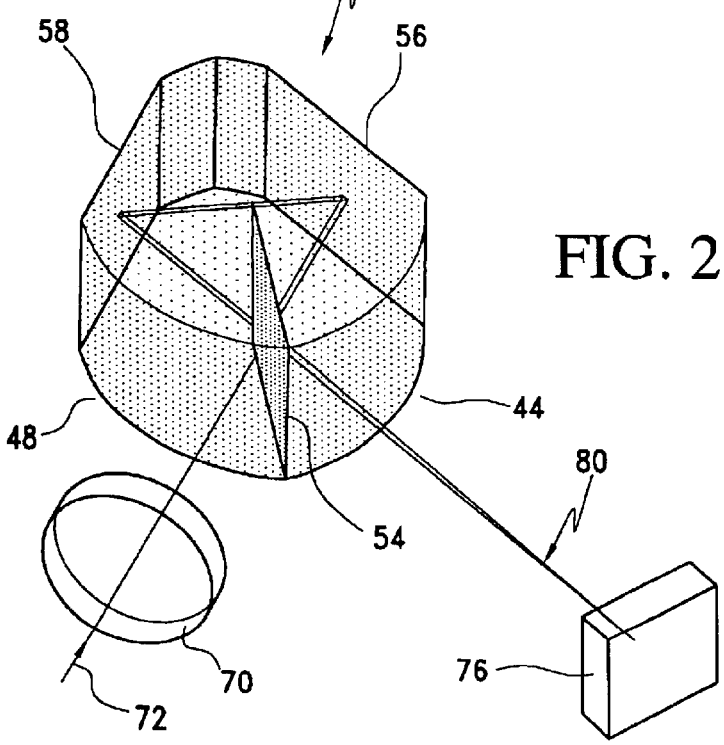
FIG. 2 is a diagrammatic three-dimensional illustration of the HFTS of FIG. 1.

In the first embodiment of the invention, a cylindrical HFTS 30 is illustrated by a ray tracing shown in FIG. 1 and in a three-dimensional schematic presented in FIG. 2. The interferometer 30 can be produced from a single glass rod 32 of an arbitrary radius R. The rod is cut along planes parallel to its longitudinal axis to form left and right segments 34 and 36 having respective cut surfaces 38 and 40 which are polished and assembled along line 42 to form the interferometer 30. The segments 34 and 36 incorporate respective cylindrical surfaces 44 and 48 which are portions of the rod, and the cut surfaces are located so that, when assembled, the axis 50 of cylindrical surface 44 lies in segment 36, and the axis 52 of cylindrical surface 48 lies in segment 34. Each of the axes 50 and 52 is at a distance R/4 from the line 42 where the polished surfaces 38 and 40 are joined. Before assembly, a coating 54 is deposited on one or both of the polished surfaces 38 and 40 to form a beamsplitter which lies in a plane parallel to, and between, the axes 50 and 52.

Mirror surfaces 56 and 58 are cut on the segments 34 and 36, respectively, with the planes of the mirror surfaces being parallel to the axes 50 and 52 and being cut at angles 60 and 62 of 30° each with respect to the plane of the beamsplitter 54. Each of the mirror surfaces 56 and 58 is located on one segment and faces a corresponding cylindrical surface 48 and 44, respectively, on the opposite segment to form a Sagnac interferometer. The mirror surfaces thus are each located at such a distance from their corresponding cylindrical surfaces that the path of light beams propagating in the interferometer 30 and passing through both of the axes 50 and 52 will form an equilateral triangle 64. If the material of the rod has a refractive index n=1.5, which is close to the value for many optical glasses, each side of the equilateral triangle will have a length R equal to the radius of the rod.

An external input lens 70 is positioned to direct an impinging light beam 72 into the interferometer 30 through cylindrical surface 48 and to focus that light at its axis 52. The incoming beam 72 is divided at beamsplitter 54, with a first portion 74 being transmitted through the beamsplitter to pass through axis 52, be reflected by mirror 56 to mirror 58, and be reflected by that mirror back to the beamsplitter, where it is reflected out of the interferometer through cylindrical surface 44 to detector 76. Similarly, a second portion 78 of beam 72 is reflected by the beamsplitter to pass through axis 50 to mirror 58, then to mirror 56 and back to the beamsplitter, where it is transmitted to pass out of the interferometer through surface 44 to detector 76. The first and second portions 74 and 78 of the input beam 72 thus propagate in opposite directions along path 64 in the interferometer, and recombine to form exit beam 80, which is received by detector 74.

Shifting one mirror 56 with respect to the other mirror 58 along the plane of beamsplitter 54 by a distance d shears the rays 74 and 78 in the interferometer to produce two virtual images with a separation $\delta = d$.

The interferometer is fabricated by shaping the rod segment as described, forming the beamsplitter, and cementing the halves together. An experimental cylindrical interferometer was fabricated from a commercial grade silica rod with a radius R=5 mm. The beamsplitter was produced by depositing a layer of chromium 45 Å thick, and the two halves were cemented together using a UV curable epoxy. Thick layers of silver were deposited to form mirrors 56 and 58.

In operation, the external lens 70 directs the input ray 72 to the axis 52 of the first refracting surface, minimizing its aberration content. Light passing through the beamsplitter and reflected by it travels in opposite directions in the asymmetric triangular Sagnac interferometer formed by the mirrors 56 and 58 and on exit the beams are collimated in a horizontal plane (perpendicular to axes 50 and 52) by the second cylindrical surface 44. The two beams converge at the back focal plane of the output detector at a distance R/(n−1), producing an interference pattern with vertical fringes. There is a purely geometrical restriction on the numerical aperture $NA \leq 0.16$ for the interferometer in this case. A wide range of refractive index values $1.41 < n < 3$ is possible for this design.

The output image at 76 is captured by a board type monochrome camera with the aid of a consumer grade type framegrabber, and the analysis, including the aberration correction rescaling of the interference pattern, is performed off-line.

Figure 7:
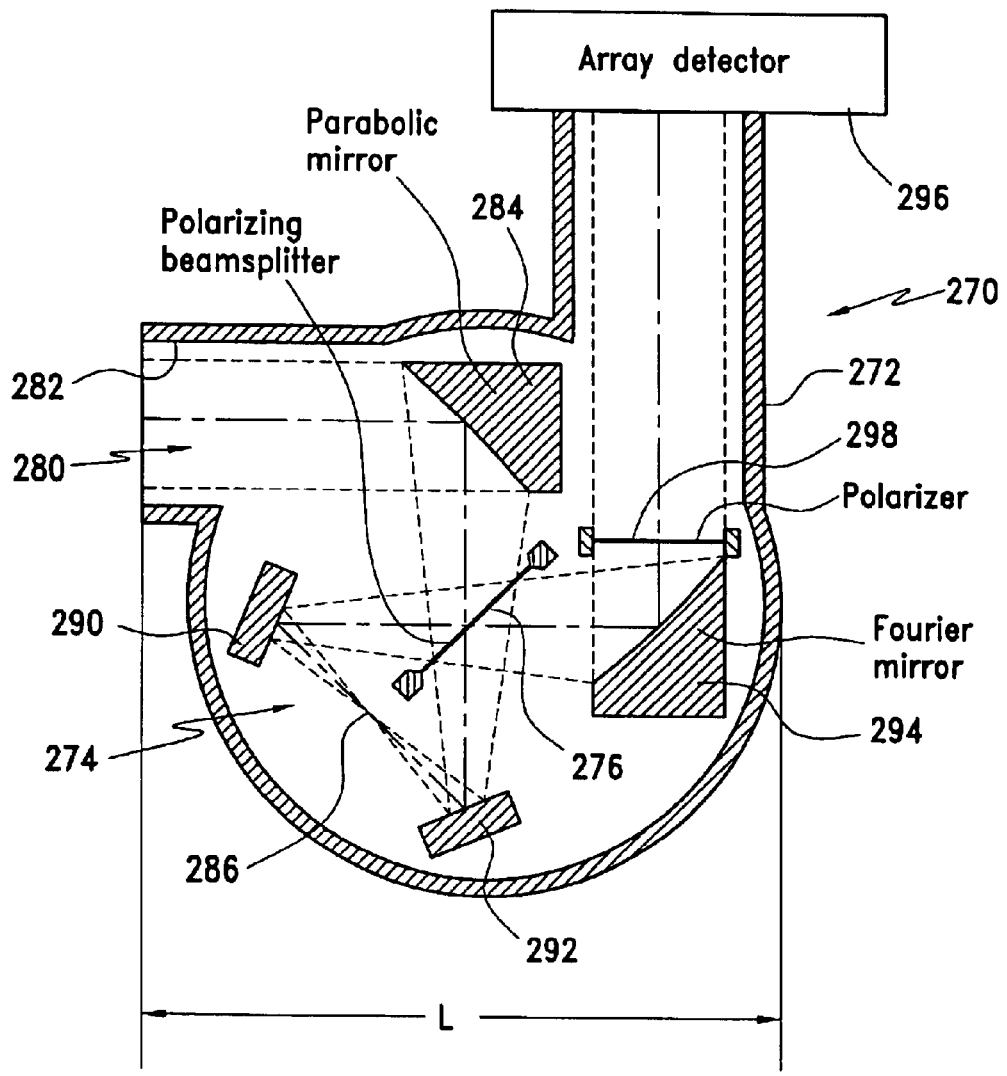
FIG. 7 is a diagrammatic illustration of the optical layout of a miniaturized HFTS incorporating an asymmetric shift interferometer in accordance with a fourth embodiment of the invention.

By replacing the cylindrical refracting surfaces 44 and 48 (FIGS. 1 and 2) with microlenses such as those illustrated 104 and 108 in FIGS. 7 and 8, a more flexible interferometer design is possible, resulting in a single block, rugged instrument, as illustrated at 110.

Figure 3:
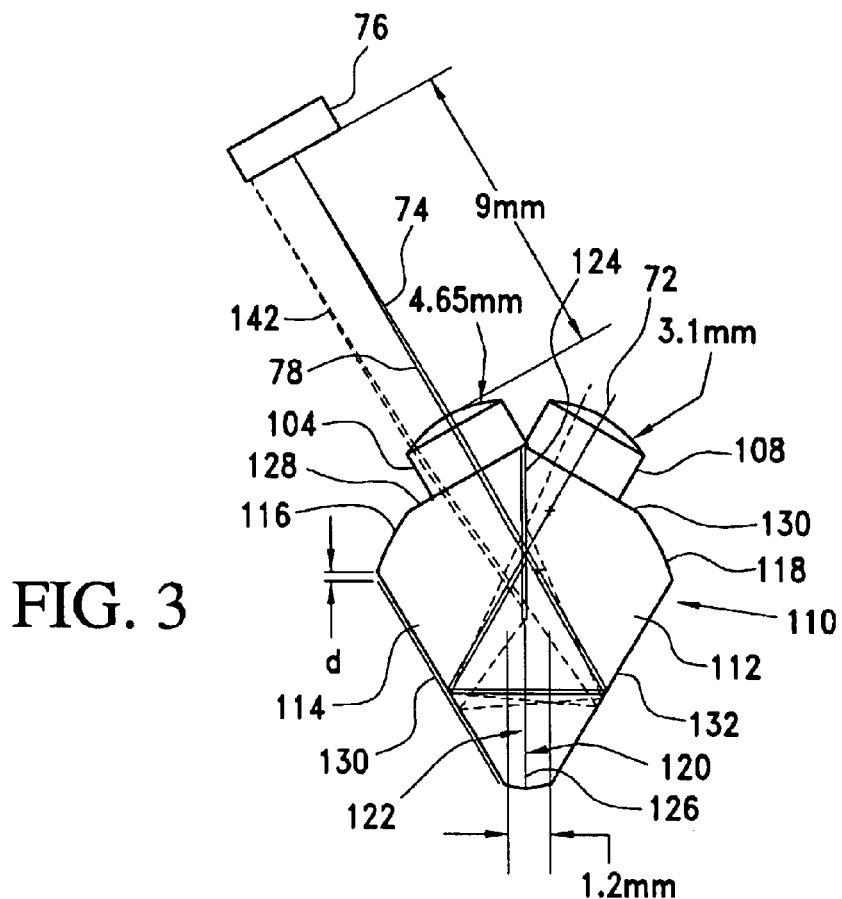
FIG. 3 is a diagrammatic ray tracing for a miniaturized HFTS using microlenses in combination with Littrow prisms, in accordance with a second embodiment of the invention.
Figure 4:
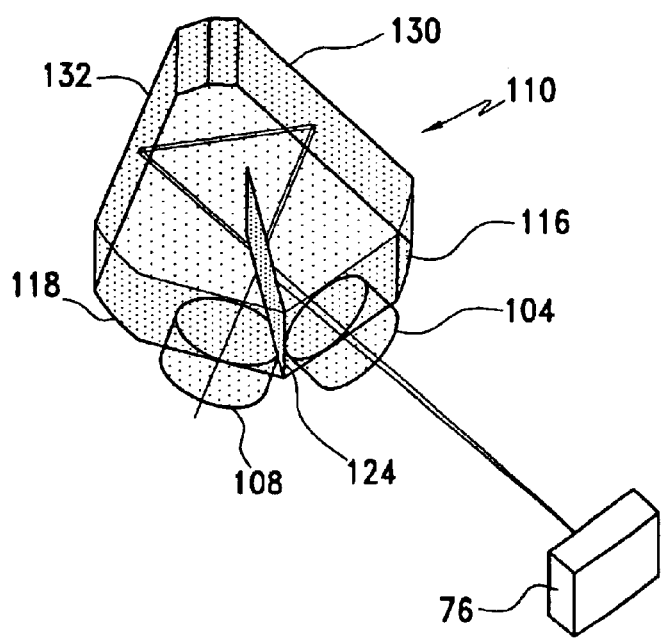
FIG. 4 is a diagrammatic three-dimensional illustration of the HFTS of FIG. 3.

In the embodiment illustrated in FIGS. 3 and 4, the microlens interferometer 110 is fabricated from a BK7 optical glass cylinder, or rod, cut along planes parallel to the cylinder axis to form segments 112 and 114 having cylindrical surfaces 116 and 118 of radius R, with the axes of each surface being located in the opposite segment, in the manner described with respect to FIGS. 1 and 2. The cut surfaces 120 and 122 of these segments are polished, one surface is coated to form a beamsplitter 124, and the two segments are cemented together at line 126 in the manner described above. In fabricating an interferometer for testing, the surface 120 and 122 were cut 0.6 mm from the locations of the segment axes so as to leave sufficient material for grinding and polishing.

The cylindrical surfaces 116 and 118 are cut to form flat surfaces 128 and 130, respectively, which are parallel to the respective segment axes, lenses 104 and 108 are cemented onto these surfaces using a UV curable index matching epoxy, and mirror surfaces 130 and 132 are formed as described above. The lenses are located to focus the inlet beam 72 as described above, to produce counterrotating beams 74 and 78 which are received by detector 76, also as discussed above.

Each of the segments 112 and 114 represents, essentially, a Littrow prism after all the surfaces are produced and a reflecting material such as silver or aluminum is deposited at the mirror surfaces 130 and 132. High quality optical polishing is required only for the beamsplitter and mirror surfaces, while the microlens bases are not so critical due to the use of an index matching glue. Precise positions of the surfaces are dictated by the focal lengths of the lenses. For an infinite conjugated optical arrangement, a pair of lenses 104 and 108 with effective focal lengths of 9 mm and 6 mm, respectively, were chosen in constructing this embodiment. With these lenses the rest of the interferometer was very similar to the cylindrical interferometer of FIGS. 1 and 2. Asymmetry in the interferometer 110 is introduced by shifting the mirror 130 by a distance d with respect to mirror 132, as shown in FIG. 3. A three-dimensional picture of the complete microlens HFTS 110 is shown in FIG. 4.

There are no external optical elements in the microlens HFTS 110. The light 72 from an infinite source enters lens 108 and forms two virtual images of the source inside the interferometer at a common focal position of both microlenses. Two corresponding beams are collimated by the exit lens and are combined at the detector 76, producing an interference pattern of the same diameter as the output lens (3 mm in this case). The numerical aperture of the instrument is NA=0.16 and it is determined by the parameters of the output Fourier lens 104 as is illustrated by the marginal ray 142 shown in FIG. 3 with a broken line.

The interference pattern obtained from interferometer 110, is sampled and processed off-line as described above.

In a third embodiment of the invention, illustrated in FIGS. 5 and 6, a simplified interferometer 200 is fabricated from standard optical components readily available from most suppliers. In this embodiment, the interferometer 200 is fabricated from two Littrow prisms 202 and 204 of BK7 glass, having surfaces formed by bases 206, 208, sides 210, 212, and hypotenuses 214, 216, respectively. A beamsplitter 220 is formed on one of the surfaces 214 or 216, and these surfaces are then glued together using an index matching glue to form the interferometer.

Surfaces 210 and 212 are coated to form mirrors, and lenses 222 and 224, also of BK7 glass, are secured to the surfaces 206 and 208, respectively. The lenses are selected so that the focal point 226 for lens 222 is located in prism 204, while the focal point 228 for lens 224 is located in prism 202, as illustrated by the ray diagram in FIG. 5. As described above, an impinging light beam 72 enters the interferometer through lens 224 and is split at the beamsplitter to produce counter-rotating beams 74 and 78 to propagate and to exit from the interferometer through lens 222. The exit lens focuses the exit beam 80 on detector 76. The dotted lines 230 illustrate the location of the marginal ray for the device.

The prisms 202 and 204 act as a Sagnac interferometer. Asymmetry is introduced by shifting one of the prisms with respect to the other by a distance d along the line of the prism hypotenuse, as illustrated in FIG. 5. The size of the interferometer is established by the size of available prisms, and typical dimensions are illustrated in the Figure. A three-dimensional illustration of the Littrow prism interferometer 200 is shown in FIG. 6.

Assembly of the two Littrow prisms may be carried out on precise positioning stages, providing a complete six-dimensional control of their mutual positions (X, Y, Z and 3 rotational axes) combined with a real time monitoring of the fringe orientation, to ensure accurate alignment of the prisms. A complete spectral device incorporating the interferometer may include a case to hold the interferometer, a 45° mirror to direct the output beam at the detector, and a board level camera such as a PixeLINK PL-A633 from Vitana Corp. with 1280×1024 active pixels (7.5 $\mu$m×7.5 $\mu$m each), with the output from the camera being supplied to a suitable computer.

In the interferometer 200, the two identical lenses are used in the infinite conjugate arrangement, resulting in cancellation of aberration coefficients for odd powers of the field coordinate. The intermediate virtual images of the source are formed exactly at the Littrow prism hypotenuse at equal distances from both lenses. The maximum numerical aperture of this device NA=0.2.

In the computer controlled instrument described above, the interference pattern is digitized with a 1.3 megapixel CMOS sensor and the resulting signals are sent to a computer equipped with an IEEE-1394 port. The software written in LabVIEW uses the standard API library, provided by the sensor manufacturer. Operating parameters, including in particular the exposure time, size of the subwindow, and gain can be controlled through the software. All digital processing, including aberration correction, Fourier transformation, and output of the spectrum on the computer monitor, is performed in real time.

Common to all described embodiments, the dispersion of the refraction coefficients n (of the Fourier lens) and n' (of the medium between the Fourier lens and the detector) is responsible for the wavelength dependence of the focal length of the Fourier lens f=r|(n−n') and a corresponding change of the coefficient $\delta$|f, determining the scaling of the interferogram in the detector plane. The intensity at the detector is modulated by factors $\cos 2\pi\sigma_0(\delta|f_0)y'$ and $\cos 2\pi\sigma(\delta|f)y'$ for wavenumbers $\sigma_0$ and $\sigma$. If one of the frequencies is chosen as a reference (let it be $\sigma_0$) then all other frequencies will appear shifted in the spectrum according to the following formula:

$$\sigma_m = \sigma f_0|f = \sigma n'_0(n-n')/[n'(n_0 - n'_0)],$$

where $\sigma$ is the true value of the frequency and $\sigma_m$ is its measured value.

In the miniature HFTS described herein, the frequency of the HeNe laser $\sigma_0$=15802.37 cm$^{-1}$ can be chosen as a reference and the frequencies in the spectrum are corrected with respect to it by the software according to the above formula, thus taking care of this chromatic aberration.

In another embodiment of the invention, a miniaturized interferometer is fabricated for measuring spectra in a vacuum enclosure. As illustrated in FIG. 7, a static vacuum HFTS 270, based on an asymmetric shear interferometer design, is provided for measuring the electromagnetic and magnetic T-ray (THz) spectrum. In order to measure this spectrum accurately where atmospheric absorption is significant, a vacuum enclosure 272 is provided, in which is provided a compact optical interferometer 274 incorporating a polarizing grid beamsplitter 276 to produce two counter-propagating beams.

As illustrated, a beam 280 of radiation to be analyzed enters an inlet passage 282 of enclosure 272 of the spectrometer and impinges on a first, input parabolic mirror 284 mounted at the end of the inlet passage. The mirror 284 deflects the beam, and focuses it at a point 286 in the interferometer 274. This internal focus is a key element for the compact design. Between the mirror 284 and the focus point 286, the deflected radiation strikes the beamsplitter 276, which divides it into first and second beam segments. The portion of radiation 280 having a polarization vector which is parallel to the beamsplitter grid is reflected (to the left of the beamsplitter in FIG. 7) to form a first beam segment, and the radiation with a polarization vector perpendicular to the beamsplitter grid is transmitted to form a second beam segment.

The reflected radiation segment is directed to a mirror 290, while the transmitted radiation segment strikes a mirror 292, and both mirrors direct the radiation toward focus point (286). The reflected light beam segment propagates in a counterclockwise direction in the interferometer, and is reflected by mirror 292 back to the beamsplitter, where it is again reflected and is directed toward a Fourier exit mirror 294. Similarly, the transmitted light beam segment propagates in a clockwise direction in the interferometer, and is reflected by mirror 290 back to the beamsplitter, which transmits it and directs it toward exit mirror 294.

Exit mirror (294) is parabolic, and collimates the reflected and transmitted beam segments so that they recombine at a detector 296. Since these beams have orthogonal polarizations, a second polarizer 298 is provided between mirror 294 and detector 296 to cause the beam segments to interfere at the detector.

An important element is the polarizer grid beamsplitter 276 shown in FIG. 7. The 4 $\mu$m grid separation of a holographic grid polarizer, such as that available from Sciencetech, makes possible operation of the HFTS from mm-waves to 1000 $cm^{-1}$.

The overall dimension L of the spectrometer is directly proportional to the diameter of the collimated beam 280 entering the device. For an input beam diameter of a few centimeters the value L can be on the order of 10 cm, so that the entire vacuum spectrometer can be made portable.

Another dimensional constraint is related to the size of the array detector 296. Commercially available focal plane arrays with spectral ranges from 1 $\mu$m to 1000 $\mu$m are now available, making possible the construction of extremely broad range and fast spectrometers. For example, the pyroelectric camera Pyrocam m from Spiricon has an array detector with 12.4 mm×12.4 mm active area so the diameter of the output beam of the interferometer should be slightly larger than 1 cm. Assuming that this array is used, the resolution for different arrangements can be calculated. The number of the detector elements N=124, so the diameter of the output lens is restricted by the detector width: D=12.4 mm, and for the high frequency cutoff 420 $cm^{-1}$ is assumed. Then $\delta\sigma=8$ $cm^{-1}$. For F=5, l=0.31 cm. By sampling only one half of the interference pattern, the resolution can be reduced by a factor 2 so that $\delta\sigma=4$ $cm^{-1}$. Further improvement of the resolution can be achieved by using a larger array detector with more elements.

Although the invention has been described in terms of preferred embodiments, it will be understood that modifications and variation may be made without departing from the true spirit and scope there of as set out in the following claims.

What is claimed is:

1. A digitally aberration corrected holographic Fourier transform spectrometer, comprising:

an optical interferometer having an input and an output and having first and second mirrors for directing a light beam received at said input along a path between the input and the output;

a beamsplitter in said path located to divide said light beam into first and second beams traveling in opposite directions along a portion of said path including said first and second mirrors, said beams being directed at said output by said beamsplitter;

said first and second mirrors being displaced to shift said first and second beams to produce two virtual images;

optical means in said interferometer for recombining said beams at a location outside of said interferometer;

a detector at said location for receiving said recombined beams and detecting interference between said beams; and means connected to said detector for digitally correcting aberrations in interference patterns produced at said detector by said beams.

2. The spectrometer of claim 1, wherein said optical means are cylindrical lenses at said input and output on said interferometer.

3. The spectrometer of claim 2, wherein said cylindrical lenses each have a focal line intersecting the said path at a right angle.

4. The spectrometer of claim 1, wherein said optical means are spherical lenses at said input and said output on said interferometer.

5. The spectrometer of claim 1, wherein said interferometer comprises first and second Littrow prisms, said input being a surface of said first prism and said output being a surface of said second prism.

6. The spectrometer of claim 1, wherein said optical means are first and second parabolic mirrors at said input and said output.

7. The spectroscope of claim 6, wherein said beamsplitter is a first polarizer combined with a second polarizer before said detector.

* * * * *

UNITED STATES PATENT AND TRADEMARK OFFICE
CERTIFICATE OF CORRECTION

| | |
|---|---|
| PATENT NO. | : 6,930,781 B2 |
| DATED | : August 16, 2005 |
| INVENTOR(S) | : Nikolay I. Agladze et al. |

It is certified that error appears in the above-identified patent and that said Letters Patent is hereby corrected as shown below:

<u>Column 1,</u>
Line 8, insert the following:
-- STATEMENT REGARDING FEDERALLY SPONSORED RESEARCH OR DEVELOPMENT
  This invention was made with Governmental support from DARPA under Contract No. MDA972-00-1-0021. The Government has certain rights in this invention. --.

Signed and Sealed this

Twenty-first Day of February, 2006

JON W. DUDAS
*Director of the United States Patent and Trademark Office*